May 11, 1965 K. E. BATCHER ET AL 3,183,363

LOGIC MECHANIZATION SYSTEM

Filed Feb. 26, 1962 2 Sheets-Sheet 1

| TIME | CORE | | | | | | |
|---|---|---|---|---|---|---|---|
| | 10 | 12 | 14 | 16 | 18 | 20 | 22 |
| INITIAL | 0 | 0 | 0 | 0 | 0 | 0 | 0 |
| 1+ | I | I | 0 | 0 | 0 | 0 | 0 |
| 2+ | 0 | I | I | 0 | 0 | 0 | 0 |
| 3+ | 0 | I | 0 | I | I | 0 | 0 |
| 4+ | 0 | 0 | 0 | 0 | I | I | 0 |
| 1+ | J | J | 0 | 0 | I | 0 | I |
| 2+ | 0 | J | J | 0 | 0 | 0 | 0 |
| 3+ | 0 | J | 0 | J | J | 0 | 0 |
| 4+ | 0 | 0 | 0 | 0 | J | J | 0 |

*INVENTORS.*
KENNETH E. BATCHER
HAROLD R. GREENE
*BY* SAUL B. YOCHELSON

ATTORNEY

May 11, 1965 K. E. BATCHER ET AL 3,183,363

LOGIC MECHANIZATION SYSTEM

Filed Feb. 26, 1962 2 Sheets-Sheet 2

INVENTORS.
KENNETH E. BATCHER
HAROLD R. GREENE
SAUL B. YOCHELSON

BY [signature]
ATTORNEY 3,183,363
LOGIC MECHANIZATION SYSTEM

Kenneth E. Batcher, 1010 W. Green St., Room 510, Urbana, Ill.; Harold R. Greene, 47 Apple Orchard Drive, New Shrewsbury, N.J.; and Saul B. Yochelson, 10010 Lasaine Ave., Northridge, Calif.

Filed Feb. 26, 1962, Ser. No. 175,681
7 Claims. (Cl. 307—88)

The present invention relates to a logic mechanization system and more particularly to a system having diodeless core logic circuits.

Magnetic core circuits capable of performing digital logic and storage have been known for a number of years. Most of these circuits have used toroidal magnetic cores as the primary logic and storage elements but have resorted to the use of diodes or transistors as coupling elements between the cores. Circuits have been described that do not use such coupling elements. The circuits that do not use semiconductors used linear dissipative elements. The resulting circuits are characteristically slow.

The system of the present invention is based on the use of conventional square-loop ferrite magnetic cores for all operations. It differs from common core-diode or core-transistor logic systems in that no semi-conductors or other active coupling elements are needed and differs from other diodeless core logic systems in that there are no inherent limitations on speed, logic capabilities, or branching capabilities other than the characterisics of the cores themselves.

The present system uses the threshold characteristics of the magnetic cores as the non-linearity needed to achieve directivity of information flow. In addition to the cores needed as information storage elements, added cores are used in place of the diodes or similar non-linear devices found in the conventional core logic system. Control of directivity is achieved by biasing certain cores up to their thresholds, resulting in the inhibiting of some cores from switching and the aiding of the switching of other cores. Arrangements are made so that the voltages induced in each coupling loop by switching core are always opposed by another switching core. Thus there is no need to reset some of the cores slowly.

It is the general object of the invention to avoid and overcome the foregoing and other difficulties of the prior art practice by the provision of a simplified and compact magnetic core logic and storage system.

Another object of the present invention is to provide a magnetic core switching circuit which is highly reliable and resistant to nuclear radiation.

Another object of the invention is to provide a magnetic core switching circuit which will operate at coincident current speed of the cores while still permitting multiple branching.

Another object of the invention is to provide a diodeless core logic and storage system that is capable of operating at high rates of speed with few restrictions on logic operation and branching.

Another object of the invention is to provide a magnetic circuit that takes information stored in one magnetic core and transfers it in a predictable and a desired manner to a second magnetic core.

The exact nature of this invention as well as other objects and advantages thereof will be readily apparent from consideration of the following specification relating to the annexed drawing in which.

Figures 1, 2:
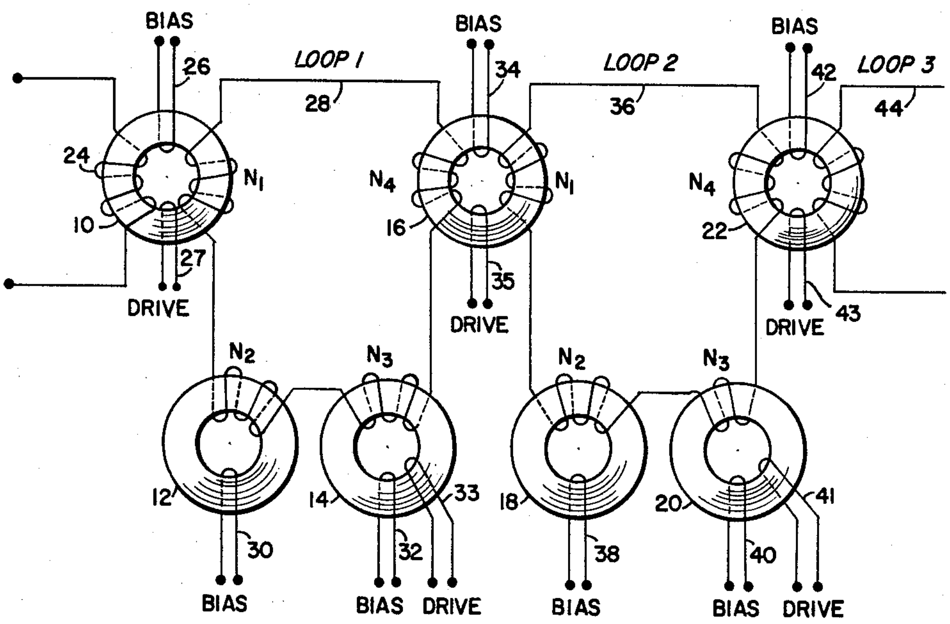
FIGURE 1 is a diagram of the basic switching circuit according to the invention and represents a one-bit shift register.
FIGURE 2 is a tabulation of the flux patterns in the cores during two operating cycles.

The basic switching circuit of FIG. 1 has a plurality of separate magnetic elements designated as cores 10, 12, 14, 16, 18, 20, and 22. The cores are preferably, but not necessarily, conventional toroidal ferrite magnetic cores such as are commonly used in digital computer memories. The prime characteristics of the magnetic cores are the presence of a relatively square hysteresis loop and a well-defined coercive threshold. A drive winding 27 and a bias winding 26 surrounds the core 10. A low resistance wire conductor 28 interconnects cores 10, 12, 14, and 16. The wire 28 formes a continuous circuit indicated as loop 1 and connects the respective cores in series. Each core contains a number of turns of the wire 28. The sense of the turns on cores 10, 14 and 16 are identical and are opposite the sense of the turns on the core 12.

A bias winding 30 surrounds the core 12 and a bias winding 32 surrounds the core 14.

A bias winding 34 and a drive winding 35 surrounds the core 16. A low resistance wire conductor 36 interconnects the cores 16, 18, 20 and 22 in series. The wire 36 forms a closed circuit indicated as loop 2. The wire 36 has a number of turns around each of the cores 16, 18, 20, and 22. The sense of the turns around cores 16, 22 and 20 are identical and are opposite the sense of the turns on core 18.

A bias winding 38 surrounds the core 18 and a bias winding 40 surrounds the core 20. The cores 18 and 20 are biased toward the positive state almost to their threshold. A bias winding 42 and a drive winding 43 surround the core 22. A low resistance wire 44 forms the loop 3 and has a portion which surrounds the core 22. The wire 44 may be connected to additional cores similar to the cores in loop 1 and in loop 2. A low resistance wire 24 has a portion which surrounds the core 10. The wire 24 may be connected to additional cores similar to the cores in loop 1 and loop 2.

A core that has a negative remanent state is designed to be in the 0 state. This core is saturated with a flux pattern that is directed counterclockwise (CCW). A core that is in the positive remanent state is designated as being in a 1 state. This core is saturated with a flux pattern directed in a clockwise (CW) direction.

The table of FIG. 2 shows the state of the flux patterns in the cores at the different times of a four clock cycle for all possible combinations of bits of information. The I represents a bit of information. The J is the next bit of information being transferred through the circuit during the second four clock cycle. The I and J can be either a 0 or 1. If a bit of information in question is a 1 then the I or J, as the case may be, is read as a 1 and if the bit of information is a 0 then the I or J is read as a 0.

The circuit of FIG. 1 represents a one-bit shift register. The basic principles and assumptions involved in the operation of the circuit are: (1) The sum of the voltage drops around a loop will always be zero. (2) Whenever a core is switched, the voltage generated across its terminals in a loop will be opposed by allowing another core in the loop to be switched. (3) Selection of cores that will be enabled to switch or prevented from switching will be performed by biasing cores up to their thresholds. (4) Loop impedance is negligible.

The circuit of FIG. 1 operates in four steps, called time one, time two, time three, and time four. At each step a current pulse, on the order of one microsecond in length, is applied to the various cores to cause them to change their magnetic state or to prevent them from changing.

Assume that prior to time one all cores are in the 0 state and that at time one a bit of information, represented by a CCW current in the winding 24, tries to switch core 10. If this current is large enough, core 10 will try to switch, thereby inducing a voltage in the wire 28 of loop 1 causing a CW current to flow in this wire. This current will tend to switch the core 12. The current cannot affect core 14 or core 16 because it will tend to reset them, and they are already in the zero state. If the drive winding 24 current is sufficiently large, core 10 will switch as will core 12. The voltage induced in the low resistance wire 28 by core 10 must be equal to that induced by core 12 because there are no other voltage drops in the circuit. The current in loop 1 will adjust automatically to insure this condition. A positive bias less than the threshold is applied to cores 10 and 12 to reduce the current in winding 24.

If core 10 and core 12 have the same number of turns of loop 28, both cores will contain equal amount of flux after time one representing the bit 1. See FIG. 2. If the bit were a 0, no action would take place, since the bias currents applied to cores 10 and 12 are less than their respective thresholds.

At time two, core 10 and core 22 are driven toward the 0 state by currents applied to drive windings 27 and 43. If core 10 were set to the 1 state at time one, it would try to switch and would cause a CCW current to flow in loop 1. This current would try to set both core 14 and core 16. To isolate loops 1 and 2, it is desirable that core 16 not switch. This is accomplished by biasing core 16 toward the 0 state. Core 14 is biased toward the 1 state with a bias of almost the core's threshold. As a result, core 10 will reset, i.e. be driven back to negative saturation, and its flux will be transferred to core 14 because the voltage produced by a core is equal to the time derivative of flux. Core 12 is biased toward the 1 state with a bias less than the threshold to prevent it from resetting at this time. If core 10 is not set into the 1 state at time one, no action will take place in loop 1 because core 10 will not switch. If core 22 is in the 1 state, a CCW current will flow in loop 2. This will have no effect on core 16 because of a large reset bias applied thereto. This current in loop 2 will reset core 18. Thus, in both loop 1 and loop 2 there is a directly driven core and a load core. The respective loops are isolated and only a relatively small current flows in each loop as the sum of the voltage drops around each loop is zero.

At time three, the information in loop 1 is transferred to loop 2. At this time, core 14 is driven back to the negative remanent state by a current in winding 33. If core 14 is in the 1 state, it will switch, causing a CCW current to flow in loop 1. This current will tend to switch core 16 into the 1 state and core 12 into the 0 state. A positive bias of less than the core's threshold applied to core 12 will keep it from going to the negative remanent state, and a positive bias less than the core's threshold applied to core 16 will help it to attain the positive remanent state. Thus the flux in core 14 will be transferred to core 16 and induce a voltage in the wire 36 of loop 2. Core 18 provides a load for core 16. The core 18 is biased forward to reduce the loop 2 current, thereby reducing the loop 1 current. Reverse flow of information from loop 1 back to the winding 24 is prevented at this time by applying enough reverse bias to core 10 to keep it from switching to the 1 state.

At time four, core 16 is driven back to the 0 state which results in the transfer of flux to the core 20. Core 18 is kept from switching by the bias. Core 12 provides the load in loop 1 and its switching is aided by a negative bias. Spurious transfer of information across core 10 and core 22 is prevented by reverse bias on these cores. A negative bias on core 14 below its threshold prevents the core from switching. The action in loop 2 is identical to that in loop 1 at time two. At the end of time four all cores connected to loop 1 are in the 0 state.

From this description it can be seen that the system disclosed is endowed with directivity. That is, information has been transferred from left to right. The information flow in the desired direction is enhanced by forward bias on particular cores which should switch and information flow in the undesired direction is inhibited by a reverse bias on particular cores common to adjacent loops. At the odd times, time one and time three, information is transferred from one loop to the next. At even times, time two and time four, the information is manipulated within the loops. The cores 10 and 22 are analogous and thereby allow one bit of information in loop 1 and another bit of information in loop 3.

All of the cores can be switched in their rated switching time because (1) the circuits are so arranged that the voltage introduced into a low resistance coupling loop is cancelled by allowing other cores in the loop to switch, and (2) only selected cores are permitted to switch. The selected switching of the cores is accomplished by biasing particular cores to a point below their threshold.

For a digital logic circuit to be usable, it must have at least enough gain to overcome any losses that might be present. In diodeless magnetic core circuits, gain can be achieved by adjusting the turns ratios on the cores.

In the basic circuit of FIG. 1, flux is successively transferred from core 10 to core 14 at time two, and from core 14 to core 16 at time three. Analysis of the circuit shows that the gain is basically a function of the ratio $$\frac{N_1}{N_4}$$

where $N_1$ is the number of turns of the wire 28 around the core 10 and $N_4$ is the number of turns of the wire 28 around the core 16.

The gain in a loop must be limited to avoid switching undesired cores. This is accomplished by holding the loop current to less than twice the threshold bias applied to the cores. A large flux gain per time increment in a loop requires thin-wall cores.

The actual flux gain in a loop is decreased by losses. The relative loss due to voltage drops in the effective resistance of the loop may be decreased by decreasing required loop current to switch a core. This may be accomplished by winding these cores with more turns of the loop winding. This resistive loss could also be decreased by decreasing the resistance of the loop winding. These considerations indicate small diameter wire inside the core (for maximum number of turns) and large diameter wire between cores (for minimum effective resistance).

Restrictions on gain can be circumvented by any process that reduces the current in loop 1 at time three. This current is composed of two components; namely, the loop 2 current needed to drive core 18 and reflected from loop 2 into loop 1 and the current needed just to switch core 16.

The requirement on core 18 is that it provide a back voltage into loop 2 opposed to the voltage generated by a core 16. The flux set into core 18 is $$\frac{N_1}{N_2}$$

times the flux in core 16. If a given amount of flux is to be set into a core, the M.M.F. required can be reduced by increasing the number of cores or increasing the core height. In this case, loop 2 current is needed only to supply the excess M.M.F. over the threshold, since core 18 is biased up to its positive threshold. Hence, the loop current can be reduced almost as much as desired by increasing the number of cores used in core 18. In practice it has been found desirable to provide the gain at alternate loops and to allow for fan-out at the other set of alternate loops. This does not imply too great a logical design restriction as fan-out can take place only at one-bit intervals rather than one-half-bit intervals.

The degree of bias that can be applied to the core depends on the core material characteristics, since the threshold is never perfect. In practice, bias as high as 90 percent of the nominal threshold can be tolerated without excessive increase in noise.

As can be seen from this explanation of the basic circuit shown in FIG. 1, when cores switch they are subjected to an M.M.F. on the order of twice the threshold. Hence, they will switch in coincident current time, on the order of one microsecond for the cores used. Since all the directivity properties are satisfied by the switching of cores and since arrangements are made for cores always to be loaded by other cores, it is not necessary for cores to be reset slowly at any time, and the speed of the system is a function of the switching time of the cores. Branching is limited only to the size limitation on the cores.

The tolerance allowances of the magnetic core switching circuit of FIG. 1 may be increased by the number of loop turns on the respective cores and by the cross-sectional area of the cores. The reduction of the number of loop turns on the core 12 and the core 18 with respect to the number of loop turns on core 10 and core 16 widens the threshold characteristics of core 12 and core 18 thereby preventing them from being easily switched. This increase of the turns ratio necessitates a corresponding increase in the cross-sectional area of the cores 12 and 18. The ratio of the M.M.F. required for a full switching of a core corresponds closely to the ratio of the core outside diameter to inside diameter for a given material. An additional increase in the cross-sectional area of core 12 and core 18 without changing the inner diameter thereof further increases the tolerance of the circuit by effecting a decrease in the loop currents. The results achieved by this additional increase in the cross-sectional area of the cores 12 and 18 permits either core 16 or core 22 to simultaneously drive any number of additional branches.

Figure 3:
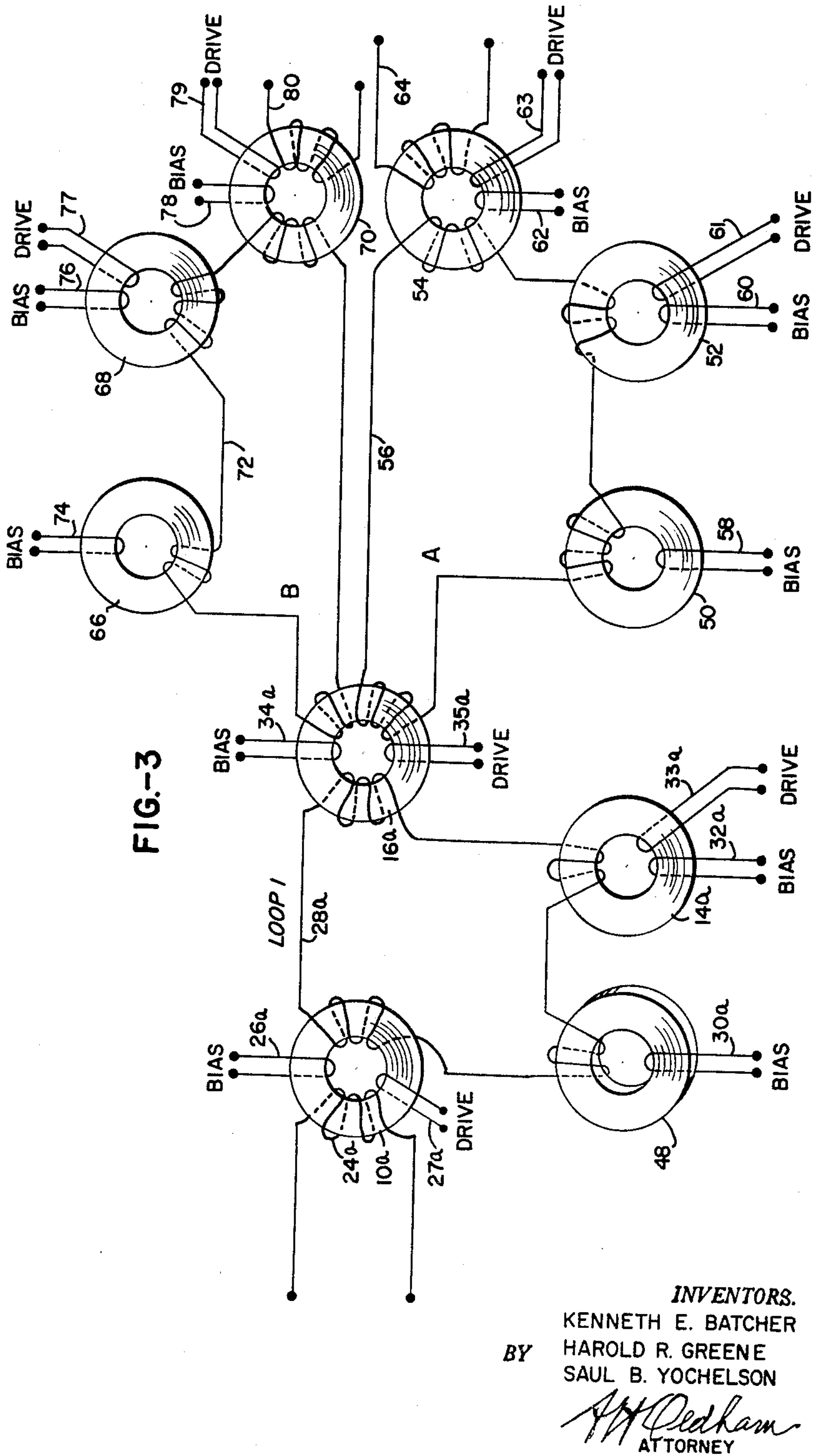
FIGURE 3 is a diagram of the modified switching circuit.

The modified magnetic core switching circuit shown in FIG. 3 includes the identical elements shown in the circuit of FIG. 1 identified with a subscript *a*. The core 12 of the circuit of FIG. 1 has been replaced in the circuit of FIG. 3 with core 48. The core 48 has an increase in cross-sectional area over the other cores of the circuit but has the same internal diameter. This increase in cross-sectional area is achieved by increasing the height of the core. The circuit of FIG. 3 shows the core **16*a*** driving two branch circuits indicated as A and B.

Branch A includes cores 50, 52, and 54, connected in series with the core **16*a* by a low resistance wire 56, a bias winding 58 surrounds the core 50. A bias winding 60 surrounds the core 52. A bias winding 62 surrounds the core 54. These cores are biased in the same manner as the cores of the magnetic circuit of FIG. 1. A drive winding 61 surrounds the core 52. A drive winding 63 surrounds the core 54. An additional loop winding 64 surrounds the core 54** and may be connected to additional branches.

The branch B includes cores 66, 68 and 70 connected in series with the core **16*a* by a low resistance wire 72. The wire 72 successively surrounds each core. A bias winding 74 surrounds the core 66. A bias winding 76 and a drive winding 77 surrounds the core 68. A bias winding 78 and drive winding 79 surround the core 70. A loop winding 80 surrounds the core 70. The loop winding 80** may be connected to an additional branch circuit.

The principles of the operation of the magnetic core circuit of FIG. 3 are identical with the operation of the basic circuit of FIG. 1.

By way of summary the cores may be described by their circuit function as coupling cores (10, 16, 22), transfer cores (14, 20) or ballast cores (12, 18). Since a common loop winding (28, 36) has the same sense on coupling cores and transfer cores, but the opposite sense on the ballast core, any loop current which tends to flow due to the setting of a coupling or transfer core tends to reset all other coupling or transfer cores in its loop. Such current also tends to set all ballast cores in its loop. The resetting of a ballast core has a similar effect on its loop as the setting of a coupling or transfer core. Essentially information is transferred within a loop successively in a left to right direction from core-to-core at the rate of one core per time increment (excluding the ballast core). This information in a loop enters at its input coupling core (left) and exists at its output coupling core (right). Information is transferred from one core to the next by resetting the former core and setting the latter one. Since the resetting of a coupling or transfer core tends to set all other coupling and transfer cores in its loop, the core to which this information is to be transferred is selected by biasing it to its 1 state threshold while the remaining coupling or transfer cores in the loop are biased to their 0 state threshold.

The level of (flux) information in a loop may be amplified as it is transferred from core to core. Thus several transfer cores may be employed in a loop to increase gain and branching capability. Also multiple cores in a loop allow a choice of branching out from several cores. Of course, the number of time increments in a bit time must be increased as the number of cores in a loop is increased.

The ballast core serves to minimize the current in its loop when information is entering or leaving this loop. When information enters a loop by setting the input coupling core, it also sets the ballast core by a like amount of flux. When this information leaves this loop by resetting its output coupling core, the ballast core is also reset to supply an equal and opposite voltage in this loop which prevents loop current from flowing which might otherwise set other cores in this loop.

It should be understood that the foregoing disclosure relates to only preferred embodiments of the invention and that it is intended to cover all changes and modifications of the examples of the invention herein chosen for the purpose of disclosure, which do not constitute departures from the spirit and scope of the invention.

What is claimed is:

1. A magnetic switching circuit comprising a first loop means forming a closed circuit and second loop means forming a closed circuit, a connecting magnetic core having separate portions encircled by the first and second loop means, bias and drive means linked with the connecting core for altering its remanent state, a first, second, and third magnetic core coupled in each loop means in series alignment with the connecting magnetic core, bias means linked to each core for selectively altering the remanent state of the cores, and drive means coupled to two of the cores in each loop, whereby information stored in the form of magnetic flux in the first core of the first loop means is transferred to the connecting magnetic core.

2. A magnetic switching circuit for transferring information stored in the form of magnetic flux in one core to a second core comprising a plurality of core means having two stable magnetic states, means interconnecting each core means in series forming a closed circuit, bias means inductively associated with the core means for switching the flux in certain core means and for preventing a switch of the flux in other core means and drive means inductively associated selectively with some of the core means for sequentially switching the flux in the core means whereby the information in the form of magnetic flux can be transferred in a predictable manner to a second core.

3. A magnetic switching circuit comprising two pairs of magnetic cores having bistable magnetic states, low resistance conductor means coupling the cores in series and forming a closed circuit, means for selectively biasing each core in the positive and negative direction to prevent one core of each pair from changing its flux state and to aid one core of each pair to change its flux state, and drive means magnetically coupled selectively with some of said cores to sequentially transfer information in the form of magnetic flux from one pair of magnetic cores to the other pair of magnetic cores.

4. In a magnetic core switching circuit, first, second, third, and fourth bistable magnetic cores, low resistance conductor means including turns surrounding a portion of each core and connecting the cores in series to form a closed circuit, the sense of the turns on the first, third and fourth core being identical and opposite the sense of the turn on the second core, means linked to the first core to drive the core to the positive remanent state thereby inducing a voltage in the wire means and driving the second core to the positive remanent state, said means linked to the first core subsequently driving the core to the negative remanent state, bias means linked to the fourth core to hold said core in the negative remanent state when the first core is driven to the negative remanent state, means linked to the third core driving said core in the positive remanent state whereby the positive flux pattern in the first core is effectively transferred to the third core, said means linked to the third core subsequently driving said core back to the negative remanent state, said bias means linked to the fourth core being reversed to urge said core to the positive remanent state when the third core is driven back to the negative remanent state and positive bias means linked to the second core to keep it from going to the negative remanent state.

5. In a magnetic core circuit, a first, second, third and fourth magnetic core having bistable magnetic states and internal openings, the first, third and fourth core having substantially identical cross-sectional areas, the cross-sectional area of the second core being larger than the other cores but having substantially the same internal opening, conductor means having negligible resistance surrounding portions of each core and connecting the cores in series to form a closed circuit, a plurality of branch circuits inductively associated with the fourth core, means to selectively bias at least some of said cores, and means to selectively drive at least some of said cores simultaneously with the selective bias to sequentially transfer information in the form of magnetic flux from one magnetic core to another wherein the reset time for each core is equal to the transfer time.

6. In a magnetic core circuit, a first, second, third and fourth magnetic core having bistable magnetic states and internal openings, the first, third and fourth core having substantially identical cross-sectional areas, the cross-sectional area of the second core being larger than the other cores but having substantially the same internal opening, conductor means having negligible resistance including turns surrounding a portion of each core and connecting the cores in series to form a closed circuit, the sense of the turns on the first, third and fourth core being identical and opposite the sense of the turns on the second core, means to selectively bias at least some of said cores, and means to selectively drive at least some of said cores simultaneously with the selective bias to sequentially transfer information in the form of magnetic flux from one magnetic core to another wherein the reset time for each core is equal to the transfer time.

7. In a magnetic core circuit, coupling magnetic cores, transfer magnetic cores, ballast magnetic cores, a common conductor means interconnecting the magnetic cores, the winding sense of the conductor means on the coupling cores and transfer cores being identical and opposite the winding sense of the conductor means on the ballast core, bias and drive means magnetically coupled selectively with some of said cores to selectively transfer information in the form of magnetic flux in the circuit.

References Cited by the Examiner

UNITED STATES PATENTS 2,978,593 4/61 Bloch et al. ............ 307—88

3,053,993 9/62 Barber ................ 307—88

IRVING L. SRAGOW, *Primary Examiner.*